United States Patent [19]

Siemers et al.

[11] Patent Number: 5,228,493

[45] Date of Patent: Jul. 20, 1993

[54] ABRASION METHOD OF FORMING FILAMENT REINFORCED COMPOSITES

[75] Inventors: Paul A. Siemers, Clifton Park; Stephen F. Rutkowski, Duanesburg, both of N.Y.

[73] Assignee: General Electric Company, Schenectady, N.Y.

[21] Appl. No.: 546,969

[22] Filed: Jul. 2, 1990

[51] Int. Cl.$^5$ .................. B21B 1/46; B21D 53/10
[52] U.S. Cl. .................. 164/46; 164/98; 164/100; 29/527.4; 29/527.6
[58] Field of Search .......... 164/98, 46, 100, 76.1; 29/527.4, 527.6

[56] References Cited

U.S. PATENT DOCUMENTS

| | | | |
|---|---|---|---|
| 3,926,624 | 12/1975 | Aronson | 164/69.1 |
| 3,948,309 | 4/1976 | Cordone | 29/527.6 |
| 4,523,365 | 6/1985 | Richmond | 29/527.6 |
| 4,775,547 | 10/1988 | Siemers | 427/34 |
| 4,805,294 | 2/1989 | Siemers | 164/46 |
| 4,886,202 | 12/1989 | Ammon | 228/120 |

FOREIGN PATENT DOCUMENTS

| | | | |
|---|---|---|---|
| 1508986 | 11/1969 | Fed. Rep. of Germany | 164/418 |
| 5428225 | 3/1979 | Japan | 164/100 |
| 2003935A | 3/1979 | United Kingdom . | |

Primary Examiner—Richard K. Seidel
Assistant Examiner—Rex E. Pelto
Attorney, Agent, or Firm—Paul E. Rochford; James Magee, Jr.

[57] ABSTRACT

A method for forming a reinforced metal structure having a filamentary reinforcement evenly distributed therein is taught. The structure is formed by the plasma spray deposit of matrix metal onto and about a filamentary reinforcement. A plurality of layers of filamentary reinforcement are embedded in the structure. Between each layer an abrasive grinding and smoothing operation is performed to render the surface of the spray deposited metal smooth and even and to permit the even spacing of filament reinforcement on the spray deposited surface. The abrasive grinding of the spray formed surface does not have deleterious effects on the property of the composite reinforced structure which is formed.

5 Claims, 2 Drawing Sheets

ABRASION METHOD OF FORMING FILAMENT REINFORCED COMPOSITES

CROSS REFERENCE TO RELATED APPLICATIONS

The subject application relates closely to copending application Ser. No. 546,200 filed Jun. 29, 1990, application Ser. No. 546,228 filed Jun. 29, 1990 now U.S. Pat. No. 4,981,643 dated Jan. 1, 1991; as well as to application Ser. No. 546,951 filed Jul. 2, 1990 now U.S. Pat. No. 5,042,710 dated Aug. 27, 1991. The text of the copending applications are incorporated herein by reference.

BACKGROUND OF THE INVENTION

The present invention relates generally to methods of forming filament reinforced matrix metal composites. More particularly, the present invention relates to a method by which a silicon carbide filament reinforcement may be incorporated effectively and efficiently in a composite having a titanium based metal matrix.

It is known that filament reinforced composite structures having matrices of titanium based metals can be formed employing plasma spray deposition techniques. A number of U.S. Patents relating to this general subject and assigned to the assignee of the subject application have been issued. The preparation of titanium alloy base foils, sheets, and similar articles and of reinforced structures in which silicon carbide fibers are embedded in a titanium base alloy are described in U.S. Pat. Nos. 4,775,547; 4,782,884; 4,786,566; 4,805,294; 4,805,833; and 4,838,337; assigned to the same assignee as the subject application. The texts of these patents are incorporated herein by reference.

Preparation of composites as described in these patents is the subject of intense study inasmuch as the composites have very high strength properties in relation to their weight. One of the properties which is particularly desirable is the high tensile properties imparted to the structures by the high tensile properties of the silicon carbide fibers or filaments. The tensile properties of the structures are related to the rule of mixtures. According to this rule the proportion of the property, such as tensile property, which is attributed to the filament, as contrasted with the matrix, is determined by the volume percent of the filament present in the structure and by the tensile strength of the filament itself. Similarly, the proportion of the same tensile property which is attributed to the matrix is determined by the volume percent of the matrix present in the structure and the tensile strength of the matrix itself.

Prior to the development of the processes described in the above-referenced patents, such structures were prepared by sandwiching the reinforcing filaments between foils of titanium base alloy and pressing the stacks of alternate layers of alloy and reinforcing filament until a composite structure was formed. However, that prior art practice was found to be less than satisfactory when attempts were made to form tube or ring structures in which the filament was an internal reinforcement for the entire tube or ring.

The structures taught in the above-referenced patents and the methods by which they are formed, greatly improved over the earlier practice of forming sandwiches of matrix and reinforcing filament by compression.

Later it was found that while the structures prepared as described in the above-referenced patents have properties which are a great improvement over earlier structures, the attainment of the potentially very high ultimate tensile strength of these structures did not measure up to the values theoretically possible. The testing of composites formed according to the methods taught in the above patents has demonstrated that although modulus values are generally in good agreement with the rule of mixtures predictions, the ultimate tensile strength is usually much lower than predicted by the underlying properties of the individual ingredients to the composite. A number of applications have been filed which are directed toward overcoming the problem of lower than expected tensile properties and a number of these applications are copending. These include applications Ser. No. 445,203, filed Dec. 4, 1989; Ser. No. 459,894, filed Jan. 2, 1990; and Ser. Nos. 455,041 & 455,048, both filed Dec. 22, 1989. The texts of these applications are incorporated herein by reference.

One of the structures which has been found to be particularly desirable in the use of the technology of these reference patents is an annular article having a metal matrix and having silicon carbide filament reinforcement extending many times around the entire annulus. Such tubular or ring structures have very high tensile properties relative to their weight, particularly when compared to structures made entirely of metal. Such structures must be precise in their internal dimensions in order for the structures to be used most effectively in end use applications inasmuch as the structures are often used as part of a more complex structure and for this purpose are fitted over one or a number of elements in a circular form in order to serve as a reinforcing ring.

One of the structures which is formed has the reinforcing filament wound many times and in many layers around the circumference is a reinforced ring or tubular structure. A reinforced ring can be used for example as a reinforcment, for an integrally bladed compressor disk of a jet engine. In order to serve to hold the blades in a compressor stage of a jet engine a large number of layers of reinforcing filaments are required.

It has been found that it is very difficult to continue to add more and more layers of filament reinforcement to a tubular or ring structure because of differences in thermal expansion coefficient and other factors. One way in which this problem has been solved is explained in copending application Ser. No. 546,228 filed Jun. 29, 1990 now U.S. Pat. No. 4,981,643 dated Jan. 1, 1991. The method disclosed in the copending application involves forming a series of concentric rings which are then assembled together to provide a reinforced ring structure having more than 100 layers of reinforcement. Such ring structures are of quite large diameter on the order of a foot or several feet and must nevertheless be nested together within very close tolerances.

While the prior art teachings of the issued patents relates generally to the successful formation of reinforced composite structures having silicon carbide filaments embedded in matrix metal environments, the processes by which such structures were formed were not totally reproducible and reliable to a degree which is entirely suitable for a manufacturing process. Part of the difficulty associated with the formation of composite structures by the teaching of the prior patents related to the spacing of the filaments. It was found, for example, that where the deposit of matrix left an uneven surface, the spacing of the plasma spray filamentary reinforcement tended also to be aligned in an uneven pattern so that in some places the filaments touched and in other places the filaments were too widely separated. Where the filaments touched in groups of two, three or four or more strands, the inadequate spacing between the strands of filaments resulted in an inadequate penetration of the filaments by the plasma spray matrix metal so that the metal did not pass between the filaments and form a bond with the metal therebeneath. Rather the plasma sprayed metal would deposit on top of the group of abutting filament strands and would leave a void there beneath which void had to be later filled to the degree possible by a consolidation process. However, such uneven spacing resulted in too dense a spacing of reinforcing filament in some locations and too sparse a spacing of filaments in other locations of the composite product.

BRIEF STATEMENT OF THE INVENTION

Accordingly, it is one object of the present invention to provide a method by which composite reinforced structures can be formed which have essentially uniform properties throughout the structure.

Another object is to provide a method which overcomes the difficulty previously experienced of uneven spacing of filamentary reinforcement and the resultant uneven distribution of matrix metal relative to the filamentary reinforcement.

Another object of the present invention is to provide a method which ensures a more even spacing of filaments in a filament reinforced composite structure and a more uniform set of composite properties throughout the structure.

Other objects and advantages of the present invention will be in part apparent and in part pointed out in the description which follows.

In one of its broader aspects objects of the invention can be achieved by forming a plasma spray deposit of a matrix metal on a generally cylindrical substrate. The deposit is then treated to smooth the surface thereof by abrasive removal of matrix metal from the high spots of the deposit which is formed. Following the smoothing of the deposited surface, a filamentary reinforcement is wound onto the smoothed surface in a pattern which provides a relatively uniform distribution of the filament over the substrate surface. With the filamentary reinforcement in place an additional layer of plasma sprayed matrix metal is deposited on, around and between the filamentary reinforcement wound on the surface. The resultant structure is found to have relatively uniform distribution of both filament and matrix material and accordingly a relatively uniform set of properties essentially throughout the composite structure.

BRIEF DESCRIPTION OF THE DRAWINGS

A detailed description of the invention which follows will be understood with greater clarity if reference is made to the accompanying drawings in which.

DETAILED DESCRIPTION OF THE INVENTION

It is known that powder metallurgy techniques have been used extensively in the formation of metal articles. One of the problems associated with powder metallurgy technology is that occasionally a particle of the powder is not a metal particle but is rather a particle of an oxide or ceramic or other non-metal. Such non-metal particles are sometimes referred to in powder metallurgy technology as inclusions or non-metallic inclusions. An inclusion is undesirable particularly in that it can serve as a focal point for the development of cracks in the powder metallurgy structure having such inclusions. Accordingly, in the metals art it is generally desirable to avoid the presence of ceramic particles in association with metal structures particularly where such particles can form the focus for the initiation of cracking.

Surprisingly, we have found that it is possible to employ ceramic abrasive materials in connection with formation of layers of plasma spray deposited metal matrix without the deleterious effects of the use of such abrasives. In particular, we have discovered that the irregular or uneven surface of an as-deposited plasma sprayed structure can be mechanically treated with abrasive substances and can be essentially rendered regular or even by use of such abrasives prior to consolidation without a detrimental capture and retention of abrasive particles which result in the initiation of cracks and cracking of the consolidated structure which is formed. We have discovered that the least dense portion of the plasma spray deposited layer is the uppermost portion of the deposited layer, and that this portion can be removed quickly and efficiently by grinding action using abrasives and with a minimum reduction in the overall mass of the deposited layer. In other words we have discovered that the uppermost portion of a plasma deposited layer is the portion of the layer having the lowest density.

It should also be realized that the preconsolidation plasma sprayed deposit has a lower density than the consolidated matrix and that the lower density is due to the formation of voids in the plasma sprayed structure as the matrix metal is plasma spray deposited. The later consolidation, as by HIPing, increases the density of the matrix and also decreases the volume of voids in the matrix. While it is possible that some of the abrasive employed in smoothing the surface of the matrix does find its way into the preconsolidation voids of the matrix metal, nevertheless, it is our finding that plasma spray deposited structures reinforced by strengthening filaments do not display an increased tendency toward matrix cracking as a result of the use of abrasive materials in rendering smooth the surface formed by deposit of plasma sprayed matrix material.

The manner in which the invention may be carried out may be described with reference to the accompanying drawings.

Figure 1:
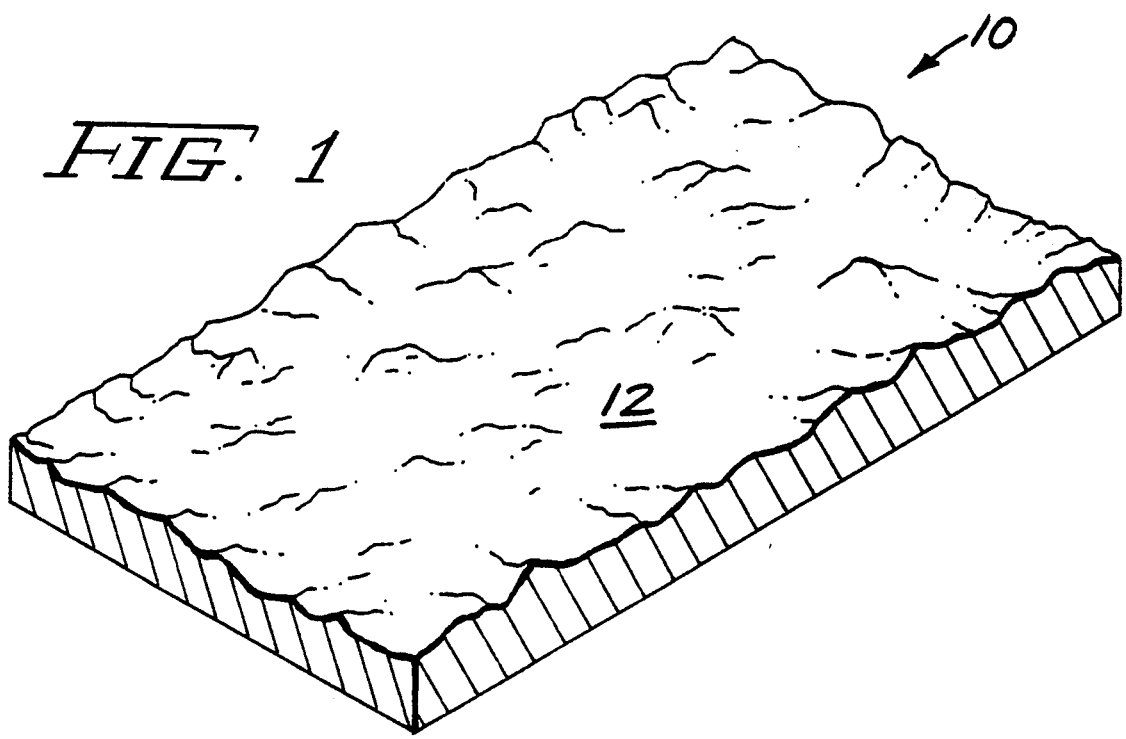
FIG. 1 is a semischematic illustration of a fragment portion of an as-deposited layer of matrix metal having an uneven and irregular surface.

Referring first to FIG. 1, a small portion, representing less than 0.1 inches of an as deposited matrix metal is illustrated. The deposit 10 is characterized by a rough surface 12 the uneven character of which is evident from both the top thereof and from the sectioned edge thereof.

Figure 2:
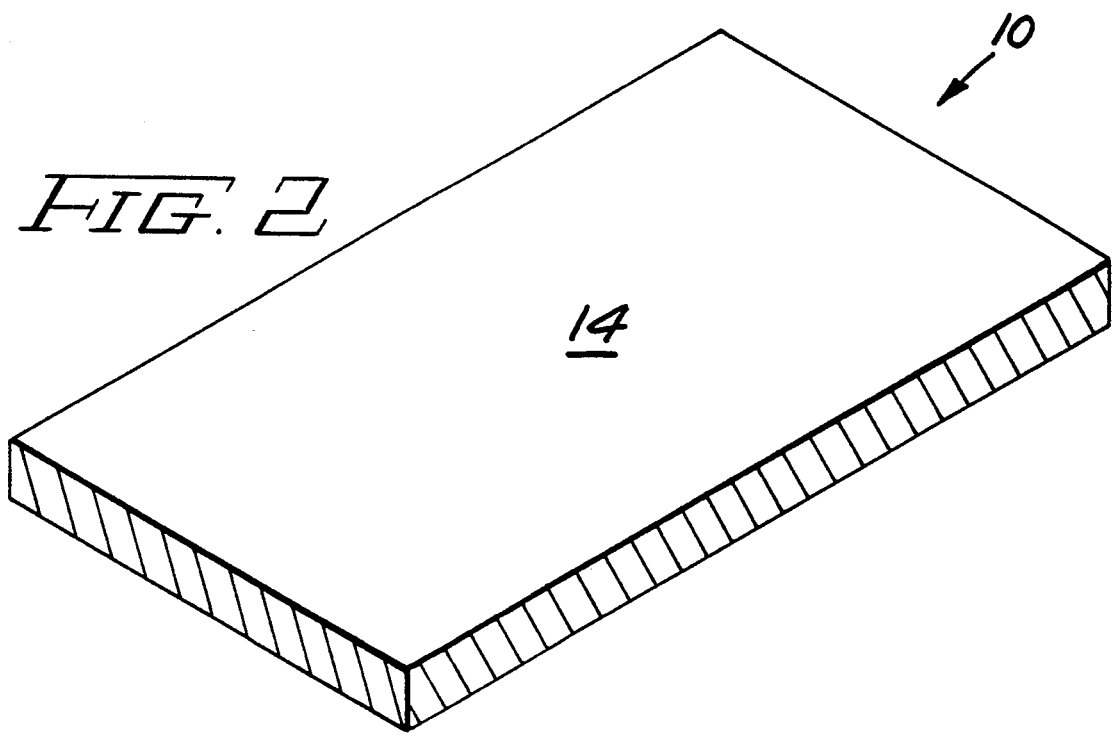
FIG. 2 is a semi-schematic illustration of the structure illustrated in FIG. 1 after the surface thereof has been smoothed by mechanical action.

The rough surface is removed by abrasive action and the more even surface 14 is illustrated in FIG. 2. About 20 to 40 percent of the thickness of the as deposited layer is removed in this way.

Figure 3:
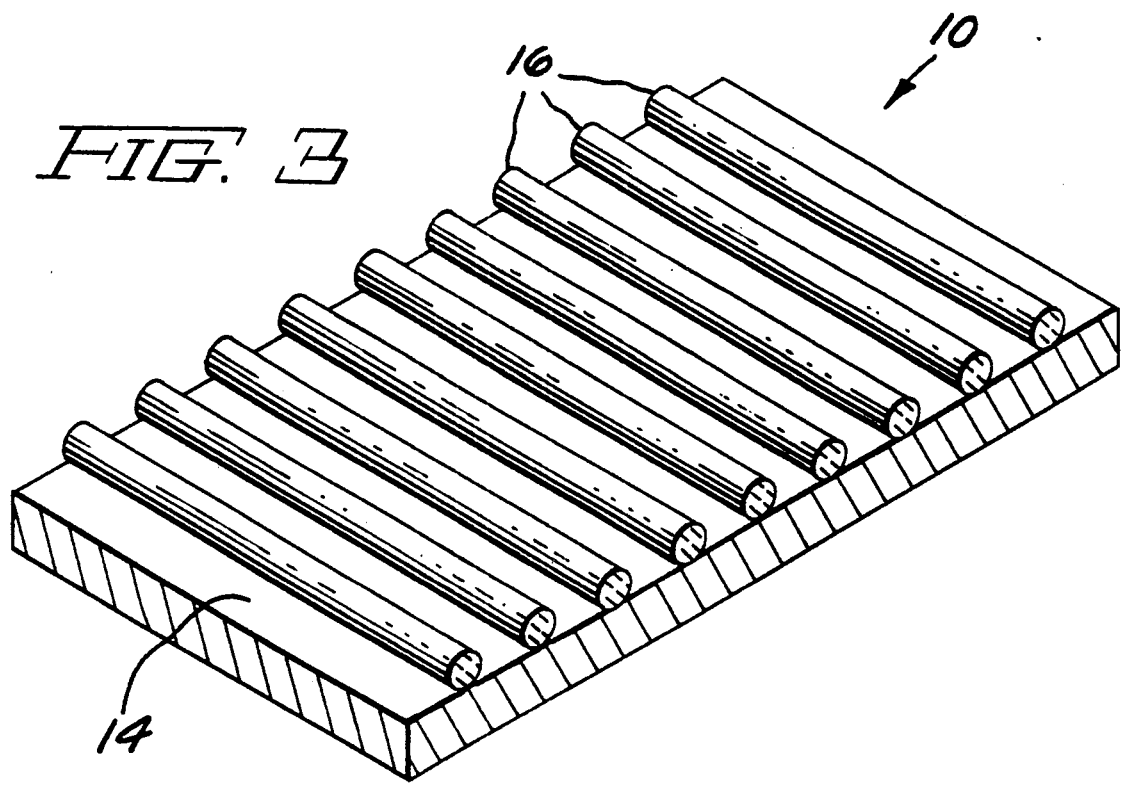
FIG. 3 is a semi-schematic illustration of a winding of filamentary reinforcement on the surface of the structure of FIG. 2.

The array of turns 16 of reinforcing filament are next wound onto the more even surface 14, a fragment of which is illustrated in FIG. 3. The relatively even spacing of the turns 16, which number over 100 per linear inch, is indicative of the even spacing achievable. The fragment illustrated in FIG. 3 is a portion of the surface of a drum around which a single reinforcing filament is wound many times to provide the layer of filamentary reinforcement.

Figure 4:
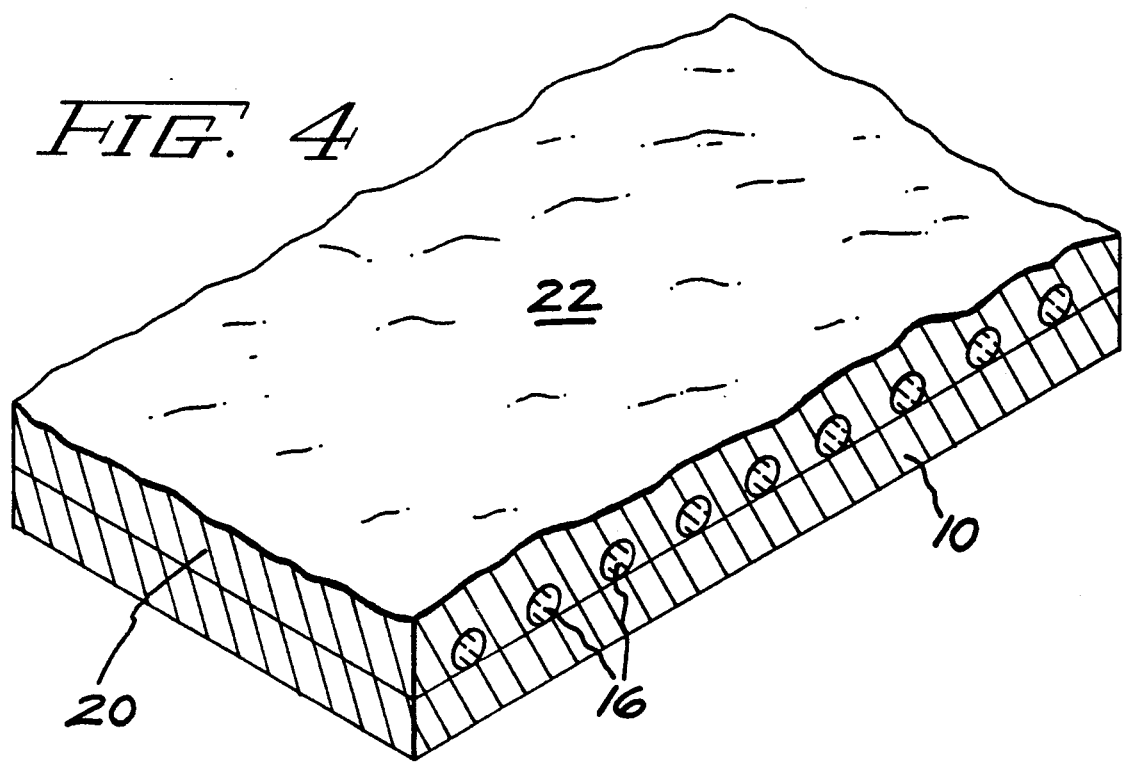
FIG. 4 is a semi-schematic illustration of a composite structure formed by plasma spray deposit of matrix metal on and about the filament of the structure of FIG. 3.

FIG. 4 illustrates the structure of FIG. 3 to which a second layer 20 of plasma spray deposited titanium base metal is added. The surface 22 of this layer is again seen to have the characteristic roughness and unevenness of the as deposited plasma sprayed layer. It is this roughness which is removed pursuant to the present invention before a second layer of filamentary reinforcement is applied.

The manner in which the method of the present invention can be carried into effect is illustrated by the following example.

EXAMPLE

A hollow cylindrical mandrel of mild steel metal, having a diameter of 4 inches and a length of 4 inches, was introduced into a low pressure plasma deposition chamber. The chamber was similar to those described in the patents referred to in the background statement of this application. An RF gun was employed to deposit a coating of titanium base metal and specifically Ti-6242 (Ti-6Al-2Sn-4Zr-2Mo) metal on the mandrel employing plasma processing techniques.

The coated mandrel was removed from the low pressure plasma deposition chamber and it was readily observed that an uneven coating having both high and low spots and a significant degree of roughness had been formed on the surface. The mandrel and coating were mounted in a lathe and the rough uneven surface of the plasma deposited coating was ground down employing 60 mesh silicon carbide abrasive in a grinding tool. Specifically, the tool employed was a belt-sanding crankshaft grinder. It was found that the grinding was effective to increase both the smoothness of the surface and also the evenness of the deposit over the surface of the mandrel. It was observed that most high spots were removed. It was also observed that if we measured the diameter before and after grinding, the diameter changed quickly after very little sanding, but then changed slowly.

A filament of silicon carbide reinforcement, specifically SCS-6 filament obtained from Textron Specialty Materials, Lowell, MA, was wound onto the smoothed surface of the titanium base alloy on the mandrel. The filament was tacked at one end and then wound continuously onto the smoothed surface of the mandrel and again it was tacked at the other end. It was found that even though more than one hundred turns of filament were wound on the smoothed surface, the spacing of the filament on the coated mandrel was quite even and there were only a few places where strands of the filament touched the adjacent filament in a manner such as would prevent the passage of sprayed metal therebetween. This is in contrast to the deposition of wound filament on a surface which had not been smoothed in that the filament had a strong tendency to cluster in the shallow pockets on the rough surface and in a manner to prevent the passage of sprayed metal between the individual strands of filament.

The mandrel with its matrix coating and layer of filament reinforcement was reintroduced into the low pressure plasma deposition chamber and a second layer of matrix metal was plasma spray deposited onto and between the turns of filament to form a layer which essentially embedded the filamentary reinforcement within the deposited matrix layer. The mandrel and its deposited layers were cooled and removed from the low pressure plasma deposition chamber, the rough uneven surface of the deposited matrix was again ground down by abrasive tools which again rendered the outer layer of matrix metal smoother and more even. An additional layer of filamentary reinforcement was wound onto the outer surface of matrix metal and the process of spray depositing an additional layer of matrix metal was carried out as described above.

After this process of grinding, winding and spraying was repeated 4 times, the ring structure formed on the mandrel was removed from the mandrel by machining and dissolving the mandrel from therewithin. Following the removal of the mandrel the ring structure was consolidated by HIPing within a conforming HIPing can and the HIPing can was then removed.

It will be appreciated that other filamentary reinforcing materials such as filamentary aluminum oxide fiber and that other matrix materials such as other titanium base alloy materials may be employed in place of those specifically designated in the above example.

Accordingly, the Applicants have provided a very effective and economical method of producing a filament reinforced metal matrix structure. It is further observed that the filament to filament spacing of the reinforcing filaments is more uniform in the composite fabricated with the aid of the grinding step than the spacing of the reinforcement which occurs when the grinding step is omitted.

What is claimed is:

1. A method of forming a filament reinforced composite ring structure which comprises
    providing a mandrel on which such structure is to be formed,
    plasma spray depositing a layer of titanium base matrix metal onto the surface of said mandrel,
    abrasive grinding the uneven surface of said deposited layer to render it even and relatively smooth,
    depositing a winding of filamentary reinforcement onto the ground surface,
    plasma spray depositing a second layer of matrix metal over and around said filamentary reinforcement,
    abrasive grinding the uneven surface of the second deposited layer to render it even and relative smooth,
    repeating the winding, spraying and grinding steps a predetermined number of times whereby a composite structure is formed.

2. The method of claim 1 in which the abrasive grinding removes between 10 and 50 percent of the thickness of the deposited layer.

3. The method of claim 1 in which the abrasive grinding removes between 20 and 40 percent of the thickness of the deposited layer.

4. The method of claim 1 in which the filamentary reinforcement is silicon carbide filament.

5. The method of claim 1 in which the winding of filamentary reinforcement is in excess of 100 turns per inch.

* * * * *